United States Patent
Laborda Rubio et al.

(10) Patent No.: US 9,018,784 B2
(45) Date of Patent: Apr. 28, 2015

(54) WIND TURBINE CONTROL METHOD

(71) Applicants: Jose Luis Laborda Rubio, Sarriguren Navarra (ES); Alberto Garcia Barace, Sarriguren Navarra (ES); Teresa Arlaban Gabeiras, Sarriguren Navarra (ES); Igor Egana Santamarina, Sarriguren Navarra (ES); Alejandro Gonzalez Murua, Sarriguren Navarra (ES); Jose Miguel Garcia Sayes, Sarriguren Navarra (ES); Miguel Nunez Polo, Sarriguren Navarra (ES)

(72) Inventors: Jose Luis Laborda Rubio, Sarriguren Navarra (ES); Alberto Garcia Barace, Sarriguren Navarra (ES); Teresa Arlaban Gabeiras, Sarriguren Navarra (ES); Igor Egana Santamarina, Sarriguren Navarra (ES); Alejandro Gonzalez Murua, Sarriguren Navarra (ES); Jose Miguel Garcia Sayes, Sarriguren Navarra (ES); Miguel Nunez Polo, Sarriguren Navarra (ES)

(73) Assignee: Accoiona Windpower, S.A., Sarriguren Navarra (ES)

( * ) Notice: Subject to any disclaimer, the term of this patent is extended or adjusted under 35 U.S.C. 154(b) by 37 days.

(21) Appl. No.: 14/041,394

(22) Filed: Sep. 30, 2013

(65) Prior Publication Data
US 2014/0097619 A1 Apr. 10, 2014

(30) Foreign Application Priority Data
Sep. 28, 2012 (ES) .................................. 201231508

(51) Int. Cl.
F03D 9/00 (2006.01)
H02P 9/04 (2006.01)
F03D 7/02 (2006.01)
F03D 7/04 (2006.01)

(52) U.S. Cl.
CPC ................ *H02P 9/04* (2013.01); *F03D 7/0224* (2013.01); *F03D 7/0284* (2013.01); *F03D 7/0296* (2013.01); *F03D 7/043* (2013.01); *F05B 2270/10711* (2013.01); *F05B 2270/309* (2013.01); *F05B 2270/337* (2013.01); *Y02E 10/723* (2013.01)

(58) Field of Classification Search
USPC .......................................... 290/44, 55; 416/1
See application file for complete search history.

(56) References Cited

U.S. PATENT DOCUMENTS

| | | | | |
|---|---|---|---|---|
| 4,297,076 A * | 10/1981 | Donham et al. | ................. | 416/37 |
| 4,366,387 A * | 12/1982 | Carter et al. | .................... | 290/55 |
| 4,420,692 A * | 12/1983 | Kos et al. | ......................... | 290/44 |
| 4,435,647 A * | 3/1984 | Harner et al. | .................. | 290/44 |
| 7,317,260 B2 * | 1/2008 | Wilson | ............................ | 290/44 |
| 7,488,155 B2 * | 2/2009 | Barbu et al. | ....................... | 416/1 |
| 7,692,322 B2 * | 4/2010 | Wakasa et al. | ................. | 290/44 |
| 7,944,067 B2 * | 5/2011 | Kammer et al. | ................ | 290/44 |
| 8,026,623 B2 * | 9/2011 | Wakasa et al. | ................. | 290/44 |
| 8,115,331 B2 * | 2/2012 | Wakasa et al. | ................. | 290/44 |
| 8,123,477 B2 * | 2/2012 | Risager et al. | .................... | 416/1 |
| 8,249,852 B2 * | 8/2012 | Thulke | ............................ | 703/18 |
| 8,299,643 B2 * | 10/2012 | Wakasa et al. | ................. | 290/44 |
| 8,395,273 B2 * | 3/2013 | Wakasa et al. | ................. | 290/44 |
| 8,449,253 B2 * | 5/2013 | Svendsen et al. | ................ | 416/1 |
| 8,546,968 B2 * | 10/2013 | Wakasa et al. | ................. | 290/44 |

(Continued)

*Primary Examiner* — Pedro J Cuevas
(74) *Attorney, Agent, or Firm* — McNees Wallace & Nurick LLC

(57) ABSTRACT

A wind turbine control method is described based on the performance of various measurements of the oscillations of the nacelle of the wind turbine for the purpose of carrying out a series of calculations, the results of which allow parameterization of certain actions on different wind turbine elements in order to dampen oscillations. In summary, it may be said that the object of the invention described herein is a wind turbine control method whereby the oscillations of the nacelle of the wind turbine are dampened in the presence of voltage dips in particular and, in general, in any event that is susceptible of reducing active current generation capacity.

14 Claims, 4 Drawing Sheets

(56) References Cited

U.S. PATENT DOCUMENTS

| | | | |
|---|---|---|---|
| 2006/0033338 A1* | 2/2006 | Wilson | 290/44 |
| 2007/0116572 A1* | 5/2007 | Barbu et al. | 416/132 B |
| 2008/0206051 A1* | 8/2008 | Wakasa et al. | 416/41 |
| 2009/0243295 A1* | 10/2009 | Kammer et al. | 290/44 |
| 2010/0111693 A1* | 5/2010 | Wilson | 416/1 |
| 2010/0119369 A1* | 5/2010 | Risager et al. | 416/1 |
| 2010/0187820 A1* | 7/2010 | Wakasa et al. | 290/44 |
| 2010/0196156 A1* | 8/2010 | Svendsen et al. | 416/1 |
| 2011/0044811 A1* | 2/2011 | Bertolotti | 416/1 |
| 2011/0156393 A1* | 6/2011 | Wakasa et al. | 290/44 |
| 2011/0309622 A1* | 12/2011 | Wakasa et al. | 290/44 |
| 2012/0029892 A1* | 2/2012 | Thulke | 703/7 |
| 2013/0001947 A1* | 1/2013 | Wakasa et al. | 290/44 |
| 2013/0230396 A1* | 9/2013 | Wakasa et al. | 416/1 |
| 2014/0003936 A1* | 1/2014 | Agarwal et al. | 416/1 |
| 2014/0097619 A1* | 4/2014 | Laborda Rubio et al. | 290/44 |
| 2014/0178195 A1* | 6/2014 | Blom et al. | 416/1 |

* cited by examiner

WIND TURBINE CONTROL METHOD

OBJECT OF THE INVENTION

The present invention falls within the field of generation of electricity from wind energy.

The object of the invention consists of a method for controlling and managing a certain wind turbine in a specific state of operation and surroundings.

BACKGROUND OF THE INVENTION

The introduction of new electrical topologies in grid-connected wind turbines and the use of new control methods has made it possible to increase the integration of electricity generation sources from wind energy in the grid, thereby contributing to the proper functioning thereof. Both in the case of configurations where the electricity generator is fully disconnected from the grid due to the use of AC/DC/AC converters in the connection of the stator thereof to the grid and in the case of doubly-fed induction generators (DFIG), the rotor of which is fed by a converter of a reduced percentage of total wind turbine power, there are various techniques for fulfilling grid requirements and for guaranteeing a certain capacity for supporting electrical disturbances without disconnecting these systems from the grid. For example, both DFIG converters and full power converters having electric torque controlled by means of power electronics equipment allow independent control of the active power and reactive power generated, thereby contributing to controlling grid voltage.

During a voltage dip wherein the grid voltage is lower than the nominal voltage to a certain degree, a wind turbine should increase its in-phase electric current when the voltage is reduced in order to produce the same power. In certain circumstances, such as for example when the wind turbine is operating at near-nominal production levels, during deep voltage dips the limitation of current in the electrical components makes it unfeasible to maintain the same power levels.

Therefore, the appearance of a voltage dip causes acceleration of the rotor. Said dynamics produce an overload in different wind turbine components. Thus, for example, the sudden loss of electric torque during a voltage dip and the fast action of the pitch control system to brake the acceleration of the rotor exerts strong loads against the tower which can shorten the life of the wind turbine.

However, it must be noted that the sudden actuation of the pitch system is harmful to the tower on suddenly braking wind thrust on the rotor and on exciting certain vibration modes thereof. Additionally, the variation in torque caused by said reduction in power evacuated by the generator also causes sideways oscillation of the nacelle, corresponding to very lightly damped modes.

In the state of the art prior to this invention, in the event of a dramatic reduction in available power, the control system acts on the pitch until the position of the blades is such that the power captured by the rotor equals the power evacuable by the grid. Said action is performed at the maximum pitch rate allowed by the actuator. Controlling the blade at the maximum pitch rate of the actuator allows the maximum braking power to be exerted on the rotor by means of aerodynamics and prevents wind turbine stop, which would lead to disconnection from the grid. This enables compliance with grid connection regulations. There are also references, as described herein, of inventions aimed at reducing the oscillations of the gondola in the event of a voltage dip.

In the current state of the art, solutions such as that provided by Patent ES2333393B1, which discloses a wind turbine control method whereby, on detecting the voltage dip in the grid, the power generated by the turbine is reduced by acting on the pitch angle to a certain degree in accordance with the power available during a voltage dip and from the wind at any given time, and power generated by the electricity generator is reduced by reducing the torque. This control method equates the power generated in dip conditions to the power available to the grid in those conditions. Said power evacuable to the grid depends on the grid voltage level, reactive current level and the maximum current limits of the system.

DESCRIPTION OF THE INVENTION

The object of the invention is a wind turbine control method that solves the previously expounded problems. To this end, a wind turbine control method whereby the oscillations of the nacelle of a wind turbine are dampened in the event of voltage dips in particular and, in general, during any event that is susceptible of reducing active current generation capacity.

Said method is applied in wind turbines comprising a rotor formed from a plurality of blades, an electric generator connected to the mains, a power train, a nacelle, a control unit and a blade pitch system configured to control the pitch angle of each blade and the method is based on data collection and the calculation of representative signals based on said data, although some data may not be captured directly but rather determined by means of calculation based on other data, which in turn may be collected directly or indirectly (tables or technical information relating to said data that can be easily accessed when required).

The method object of the invention, among its most relevant aspects, comprises a calculation phase of a signal indicative of the forward/backward oscillation (AAA) of the nacelle, which can be performed using various data capture means or sensors such as an accelerometer. Once said signal indicative of the forward/backward oscillation (AAA) of the nacelle has been obtained, a first signal indicative of the state of the grid and a nacelle damping pitch rate command in accordance with the signal indicative of the forward/backward acceleration (AAA) of the nacelle, calculating said command by applying a linear control on said acceleration signal. These data allow the calculation of a minimum dip pitch rate limit $(\Delta\beta/\Delta t)min$ lower than the maximum design pitch rate limit $(\Delta\beta/\Delta t)max$; in the event that the signal indicative of the state of the grid indicates the presence of a voltage dip, a pitch rate command will be calculated based on the tower damping pitch rate command and the minimum dip pitch rate limit $(\Delta\beta/\Delta t)min$.

The method object of the invention is based on the capture and processing of several pieces of data and on the calculation of certain parameters. To this end, at least one signal indicative of the state of the grid is captured, where said signal may be indicative of a voltage dip; said capture may be carried out in different ways, whether by sensors acting as data capture means to obtain the aforementioned grid voltage-related data, available active current (difference between the current generated by the electric generator during a dip, established in the specifications, and the reactive current required to fulfil the grid integration requirements), evacuable active power, etc., where the evacuable power is calculated based on a measured grid voltage and a maximum current limit.

Once said signal indicative of the state of the grid has been obtained, the minimum dip pitch rate limit $(\Delta\beta/\Delta t)min$ is calculated, which is lower than the maximum design pitch rate $(\Delta\beta/\Delta t)max$. As mentioned earlier, the signal indicative of the state of the grid is used to detect the presence of a voltage dip. If the presence of a voltage dip is determined from the signal indicative of the state of the grid, a series of calculations are performed to determine/calculate at least three signals, i.e. the signal indicative of a forward/backward oscillation of the nacelle, the tower damping pitch rate command in accordance with the signal indicative of the forward/backward acceleration of the nacelle, and the pitch rate command based on the tower damping pitch rate command and the minimum dip pitch rate limit $(\Delta\beta/\Delta t)min$.

To this end and following the order indicated in the preceding paragraph, the minimum dip pitch rate limit $(\Delta\beta/\Delta t)min$ is calculated in accordance with the signal indicative of the state of the grid and a signal indicative of the angular acceleration of the rotor based on a difference between electric torques, determining a first electric torque from the signal indicative of the state of the grid an instant before the detection of the voltage dip and determining a second electric torque from the signal indicative of the state of the grid an instant after the detection of the voltage dip, although the signal indicative of the angular acceleration of the rotor can also be obtained from at least two rotor speed measurements in two different instances.

These signals are necessary in order to take decisions that give rise to operations or commands or to another series of calculations to obtain additional data that will allow the wind turbine to be controlled more effectively. Therefore, the maximum time interval tmax is calculated, based on the angular rotor acceleration signal, in which a disconnection rotor rotation speed is reached as of the speed at the initial instant of the dip $\Omega 0(dip)$ and the pitch correction term $\Delta\beta$ that equates aerodynamic power captured from the wind to the power evacuable by the grid. These data allow the obtainment of the minimum dip pitch rate limit $(\Delta\beta/\Delta t)min$, which is obtained as the quotient between the pitch correction term $\Delta\beta$ and a time lower than or equal to tmax. Likewise, the pitch rate command is obtained by adding the minimum dip pitch rate limit $(\Delta\beta/\Delta t)min$ and the tower damping pitch rate command. This series of calculations allows the obtainment of all the necessary commands to carry out the method object of the invention, notwithstanding the fact that the method described herein also envisages activating a wind turbine stop in accordance with the duration of the voltage dip, as indicated earlier, upon detecting the presence of the latter as of the signal indicative of the state of the grid.

The possibility of calculating at least one torque (Tref) or power command for the inverter is also envisaged. To this end, a series of calculations must be performed to obtain: a signal indicative of the sideways oscillation of the nacelle, an initial torque (Ti) or power command as of an operating state of the turbine, a torque (Taj) or power adjustment term by applying the adjustment term to the initial command, a maximum evacuable active power (Pevacuable) as of the grid voltage (Vnet), a maximum adjustment term value (Tajmax) of the maximum value of an initial torque command (Timax) or power command as of the maximum evacuable power (Pev) and of the maximum adjustment term value (Tajmax), in order to apply the maximum adjustment term value (Tajmax) to the initial torque (Ti) or power command prior to the application of the adjustment term (Taj) for calculating the final command (Tref), thereby reserving a torque or power range so that the adjustment term dampens the sideways oscillation of the nacelle, where the maximum adjustment term value (Tajmax) is the maximum of the torque adjustment term (Taj) values applied in previous calculation cycles.

The calculations required for obtaining the final command (Tref) are based on the addition of the torque adjustment term (Taj) and the initial torque command (Ti), while the limit value of an initial torque command (Timax) is the difference between the initial torque or power command (Tmax) at which an active power substantially equal to the maximum evacuable active power (Pev) and the maximum adjustment term value (Tajmax) would be generated.

If necessary, the wind turbine brake can be activated by means of the previous calculation of a braking torque command in accordance with the signal indicative of the sideways oscillation of the nacelle and, once said command has been obtained, applying it to the power train brake. Therefore, the action of the mechanical brake of the power train is added to that of the electric torque, damping the sideways oscillation of the nacelle. It is known that said action may be performed by applying a variable braking torque in accordance with the sideways oscillation of the nacelle or by applying an all or nothing braking torque. In this second case, said all or nothing torque may also be modulated, achieving a pulse width modulation similar to the PWM used in power electronics, by varying the duty cycle.

DESCRIPTION OF THE DRAWINGS

In order to complement the description being made and with the object of helping to better understand the characteristics of the invention, in accordance with a preferred embodiment thereof, said description is accompanied, as an integral part thereof, by a set of drawings where, in an illustrative and non-limiting manner, the following has been represented.

PREFERRED EMBODIMENT OF THE INVENTION

In light of the figures, the method object of this invention is described in a more detailed manner where, for the sake of brevity, said voltage dip is sometimes referred to as dip.

Figure 1:
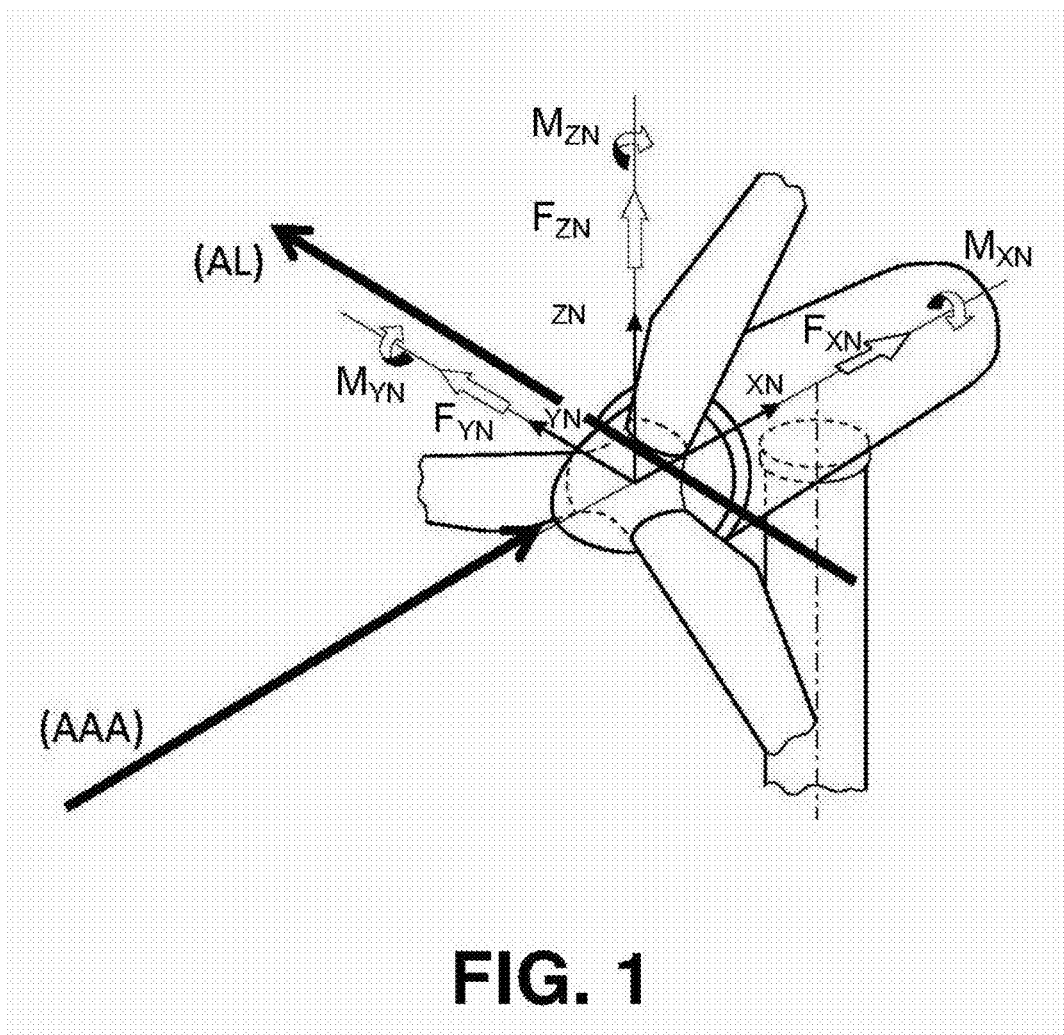
FIG. 1 shows an illustration where the main axes used to measure the forward/backward acceleration of the nacelle and the sideways acceleration of the nacelle can be observed. Said accelerations can be estimated using accelerometers disposed at the top of the tower and based on the angle of orientation of the nacelle with respect to an absolute coordinate system.
Figure 4:
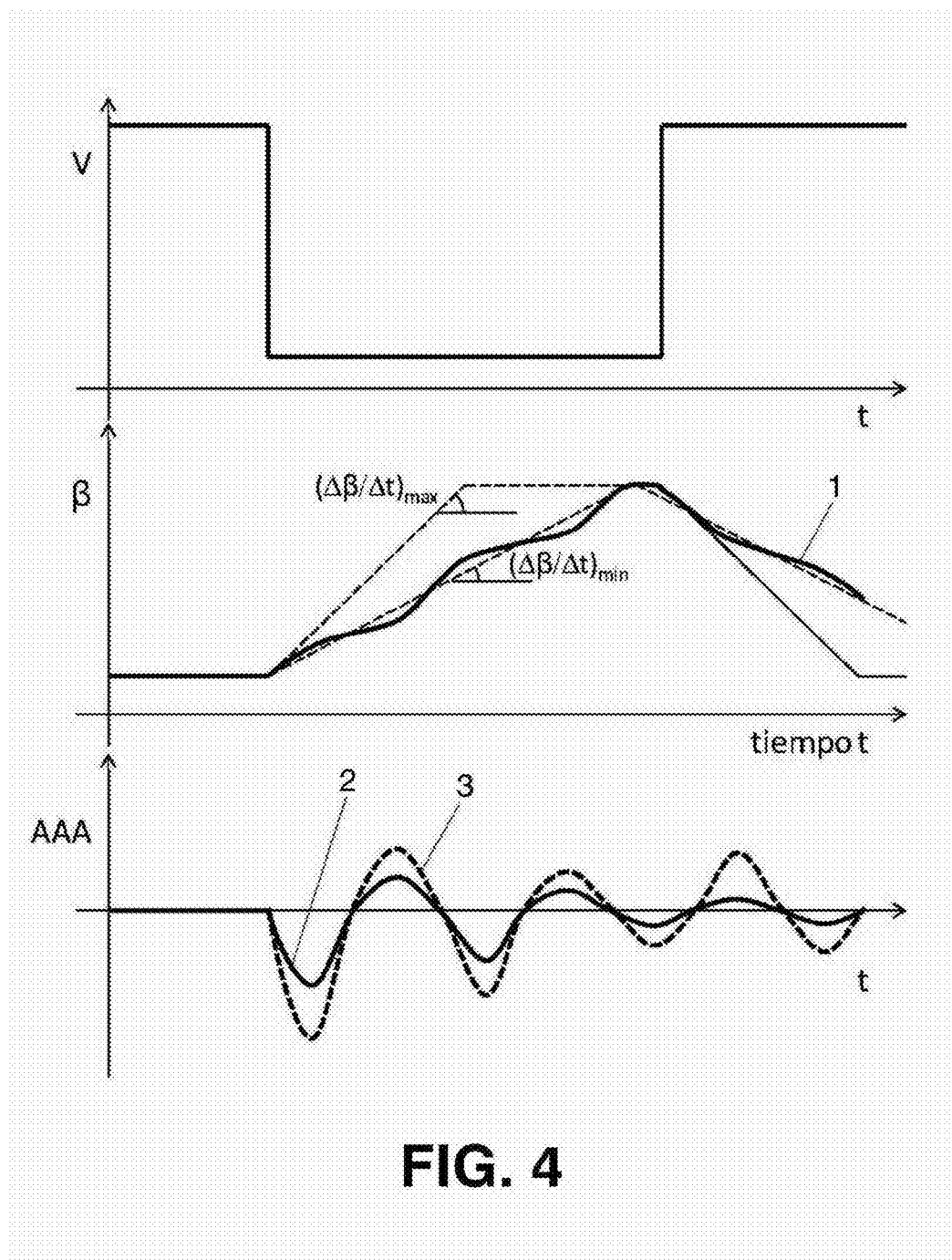
FIG. 4 shows an illustration wherein the detection of a dip from the grid voltage signal, the action with the pitch angle in accordance with the method proposed by the invention and the effect on the forward/backward acceleration (AAA) of the nacelle can be observed.

The method described herein, in any of the embodiments it can adopt, is based on the prior performance of calculations made on the basis of certain data. Said data may be, among others, a signal indicative of the forward/backward oscillation (AAA) of the nacelle, where forward/backward refers to the references shown in FIG. 1, a signal indicative of the grid state, while the values to be calculated comprise a tower damping pitch rate command $$\left.\frac{d\beta}{dt}\right|_r$$

in accordance with the signal indicative of the forward/backward acceleration (AAA) of the nacelle and a minimum dip pitch rate limit (Δβ/Δt)min lower than a maximum design pitch rate limit (Δβ/Δt)max. A signal indicative of the state of the grid which is used to detect grid voltage disturbances is calculated based on measured grid data and signals that may include voltage and current measurements, among others. When the voltage falls below a certain percentage with respect to its nominal value (said percentage is specified in the electricity wiring regulations of each region and is approximately 80%), a voltage dip is considered to have occurred. From the moment in which a voltage dip occurs, the regulations specify a minimum period of time during which the aerogenerator must remain connected to the grid, said minimum time period depending on the voltage measured as shown in FIG. 4. It should be noted that the signal indicative of the state of the grid may be, among others: grid voltage, available active current (difference between the current generated by the electricity generator during a dip, established in the specifications, and the reactive current required to fulfil grid integration requirements), the evacuable active power (hereinafter evacuable power), etc., although in alternative embodiments of the object of the invention the signal indicative of the grid is an evacuable power calculated based on a measured grid voltage and on the available active current. Said data allow the calculation of a pitch rate command $$\left.\frac{d\beta}{dt}\right|_{Total}$$

based on a tower damping pitch rate command $$\left.\frac{d\beta}{dt}\right|_r$$

and as of the minimum dip pitch rate limit (Δβ/Δt)min.

In one aspect of the invention, the signal indicative of forward/backward acceleration (AAA) is calculated by applying a linear control (5) on said acceleration signal. Further, the aforementioned minimum dip pitch rate limit (Δβ/Δt)min is a value calculated in accordance with the signal indicative of the state of the grid and based on a signal indicative of the angular acceleration of the rotor.

In particular, the minimum dip pitch rate limit (Δβ/Δt)min, which is the minimum pitch rate speed at which the pitch must move in order to brake the rotor and for the maximum rotation speed at which a stop manoeuvre is not exceeded, is calculated based on a pitch correction term Δβ and a maximum time. In turn, the pitch correction term Δβ is calculated at the initial instant of the voltage dip, so as to equate the aerodynamic power (captured from the wind) to the evacuable power calculated based on the measured voltage and on the available active current, and represents the maximum power that can be evacuated to the grid. Said evacuable power calculation can be made at each instant of time or alternatively, a single time throughout the duration of the voltage dip, in the first control cycle from the instant in which the voltage dip occurs.

Figure 2:
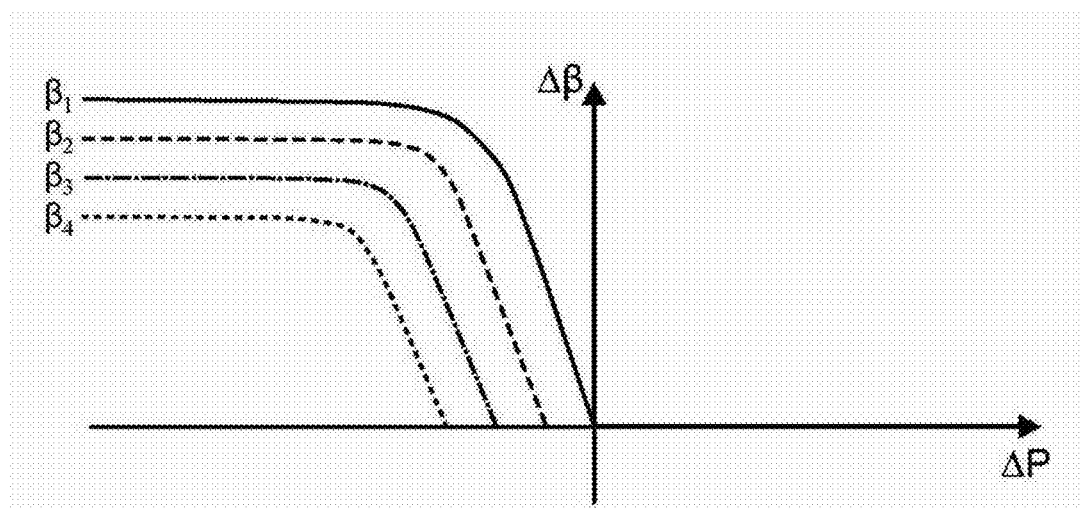
FIG. 2 shows a graph where the correction pitch angle in accordance with the difference between the evacuable power and the mechanical power can be observed.

FIG. 2 shows a preferred embodiment of the correction angle Δβ for different blade pitch positions β1, β2, . . . , calculated based on the difference ΔP between the aerodynamic power captured from the wind and the power evacuable to the grid.

The maximum time in which the pitch correction term Δβ must be reached is calculated based on a signal indicative of the angular acceleration of the rotor. In one embodiment, in order to obtain the signal indicative of the angular acceleration of the rotor, a calculation is made based on torque signals and, in another alternative embodiment, a measured acceleration can be used. For example, the signal indicative of the angular acceleration of the rotor is calculated based on a difference between a first electric torque in the instant before the voltage dip indicative of the aerodynamic torque in the initial instant of a voltage dip Taer(0), and a second electric torque Telec(dip) in the instant in which the voltage dip is detected. The electric torque in the instant in which the voltage dip Telec(dip) is detected is calculated based on the evacuable power and on the measured generator speed. Given that the evacuable electric torque is reduced during a voltage dip, the difference between an aerodynamic torque Taer and an electric torque evacuable by the electricity generator at the moment of the dip Telec(dip) will give rise to an acceleration of the rotor dΩ/dt that depends on the inertia Jr thereof, which can be expressed as follows:

$$Taer(0)-Telec(dip)=Jr \cdot d\Omega/dt$$

The angular acceleration of the rotor can be expressed as of this equation as dΩ/dt, $$d\Omega/dt=(Taer(0)-Telec(dip))/Jr$$

Said angular acceleration calculated in the previously explained manner is used as an acceleration signal.

Alternatively, the signal indicative of the angular acceleration of the rotor can be calculated based on two rotor speed measurements in two different instances, where at least one of the measurements is determined from the signal indicative of the state of the grid in an instant after the detection of the voltage dip. In the specific case that both measurements are taken during the dip, $$d\Omega/dt=(\Omega 1(dip)-\Omega 0(dip))/(t1(dip)-t0(dip))$$

Likewise, a maximum time tmax is calculated, based on the signal indicative of the angular acceleration of the rotor dΩ/dt, from the start of the dip t0(dip) in which the disconnection rotor rotation speed (rotor speed that activates a stop manoeuvre Ωmax) would be reached as of the speed in the initial instant of the dip Ω0(dip) and, consistent with the preceding notation, being Ω0(dip) the speed in the initial instant t0(dip) of the dip, the following is fulfilled:

$$d\Omega/dt=(\Omega 0(dip))/tmax$$

In another possible embodiment of the invention, the minimum dip pitch rate limit (Δβ/Δt)min is calculated as the quotient between the pitch correction term Δβ and a time Δt that is less than or equal to tmax, thereby fulfilling that $$\Delta t \leq tmax$$

$$(\Delta\beta/\Delta t)min=3/\Delta t \leq \Delta/tmax$$

In a preferred embodiment of the invention, the pitch rate command $$\left.\frac{d\beta}{dt}\right|_{Total}$$

is obtained by adding the minimum dip pitch rate limit $(\Delta\beta/\Delta t)min$ and the tower damping pitch rate command $$\left.\frac{d\beta}{dt}\right|_\tau.$$

Additionally, the electricity connection regulations usually include voltage envelopes that show the voltage levels and times at which the wind turbine must remain connected to the grid. For a certain voltage level, said regulations establish a predetermined connection time after which the wind turbine can be disconnected from the grid, activating a wind turbine stop.

Figure 3:
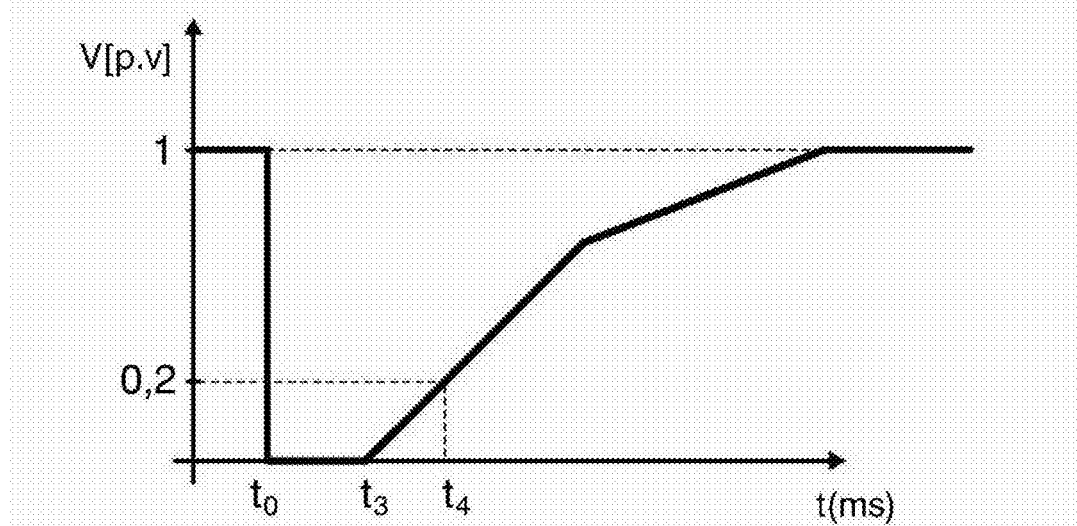
FIG. 3 shows a graph of the envelope of a voltage dip defined by the local grid operator.

FIG. 3 shows a voltage dip envelope defined by the local grid operator. Said operator requires a wind turbine to remain connected to the grid insofar as the dip remains in the interior of the envelope and allows disconnection in the event that the limits are exceeded, for example due to the excessive duration of the dip for a certain voltage drop. In said figure V it is the farm voltage that drops in an instance t0. For example, for a voltage dip where V=0.2 pu, after a time t4 has elapsed from the start the wind turbine may be disconnected from the network to protect its equipment from the currents, but for a time less than t4 it must remain coupled to the grid. The definition of said envelope varies from one country to another in accordance with the regulations. Said voltage reduction imposes a reduction in the power that can be evacuated to the grid considering the existing current limitations and farm voltage conditions. Therefore, in the previous example, the maximum time tmax elapsed from the start of the dip t0(dip) in which the disconnection rotor rotation speed would be reached (rotor speed that activates a stop manoeuvre $\Omega$max) must be greater than t4.

FIG. 4 shows the detection of a dip as of the grid voltage signal V, triggering a pitch rate actuation that gives rise to a certain pitch angle $\beta$. Said figure shows the maximum pitch rate available from the actuator $(\Delta\beta/\Delta t)max$, the minimum dip pitch rate limit $(\Delta\beta/\Delta t)min$ required to modify the pitch angle, an angle $\beta$ that equates the aerodynamic torque Taer to the electric torque evacuable by the electricity generator at the moment of the dip Telec(dip) and the pitch reached after applying the proposed control method that can be observed in a graph (1) of FIG. 4, resulting from superimposing a tower damping signal on the minimum dip pitch rate limit $(\Delta\beta/\Delta t)min$, obtained from the signal indicative of the forward/backward acceleration (AAA). As a result of the joint actuation, the acceleration of the forward/backward nacelle (AAA) applying the control method can be observed in a graph (2) of FIG. 4 is lower than that which would be measured without damping, graph (3) which can be observed in FIG. 4. The actuation strategy is equivalent at the time of recovery of the dip.

The duration of the voltage dip depends on the characteristics of the grid and on the failure that caused it. It is perfectly possible that in a wind farm the duration of a voltage dip may exceed the value established by the envelope shown in FIG. 4. In said circumstances, the detection of voltage dips that exceed the limits defined by the envelope allows the triggering of wind turbine stop manoeuvres. Envelope overshoot is performed in accordance with the duration of the voltage dip and the measured voltage level.

Figure 5:
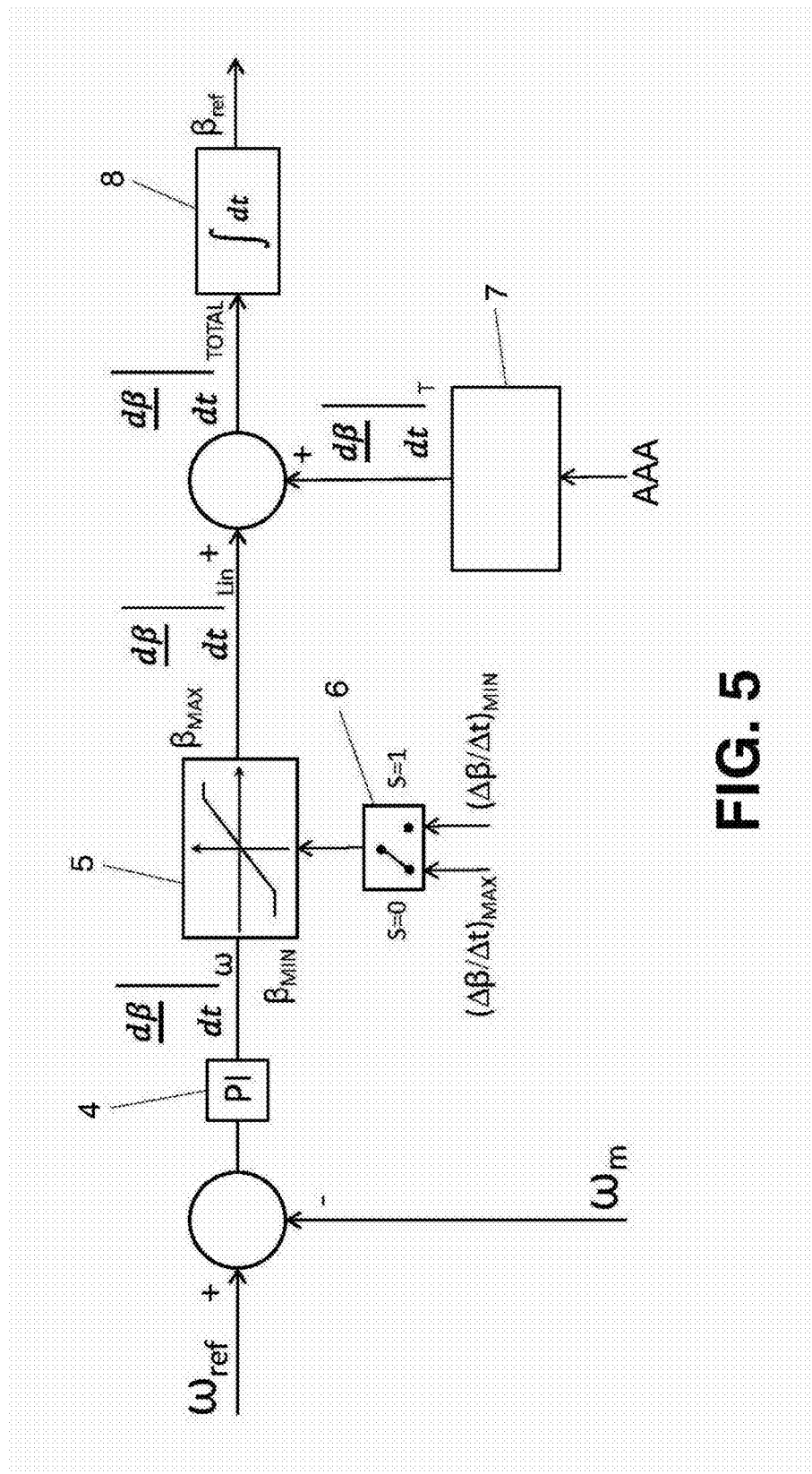
FIG. 5 shows a block diagram of a possible embodiment of the invention.

FIG. 5 shows a possible embodiment of the block diagram of the invention. In said embodiment, a resulting pitch rate $$\left.\frac{d\beta}{dt}\right|_\omega$$

is calculated in a speed regulation block (5) which subsequently passes through a saturation block (5). The limits of the saturation block (5) vary in accordance with the detection of the voltage dip. Specifically, the minimum limit 5 min of the saturation block (5) is equated to the minimum dip pitch rate limit $(\Delta\beta/\Delta t)min$, thereby guaranteeing that the minimum pitch system command implies sufficient braking to avoid the disconnection of the wind turbine due to overspeed. Also, the maximum limit $\beta$max of the saturation block (5) is selected from among two possible values in a switch (6), one of the values being the maximum pitch rate available from the actuator $(\Delta\beta/\Delta t)max$ and the other value being the minimum dip pitch rate limit $(\Delta\beta/\Delta t)min$. Therefore, when the signal indicative of the state of the grid indicates the presence of a voltage dip, the switch (6) selects the minimum dip pitch rate limit $(\Delta\beta/\Delta t)min$ in such a manner that, being lower than the maximum pitch rate limit available from the actuator $(\Delta\beta/\Delta t)max$, it is added to the tower damping pitch rate $$\left.\frac{d\beta}{dt}\right|_\tau$$

obtained from the forward/backward acceleration (AAA) of the nacelle that contributes to reducing the oscillations thereof. Therefore, the pitch rate actuation obtained from the rotor speed regulation once adequately limited in accordance with the presence or non-presence of a voltage dip $$\left.\frac{d\beta}{dt}\right|_{Ltm},$$

obtained from the forward/backward acceleration (AAA) of the nacelle in a regulator block (7) tuned to dampen at the tower resonance frequency. The total pitch rate command thus obtained $$\left.\frac{d\beta}{dt}\right|_{Total}$$

is integrate in an integrator block (8) in order to give the final pitch reference $\beta$ref that will be sent to the pitch actuator (not shown), which will originate a blade movement towards a pitch angle approximately equal to the total reference pitch angle $\beta$ref.

The invention claimed is:
1. A wind turbine control method comprising:
   a rotor that in turn comprises a plurality of blades,
   an electricity generator connected to the grid,
   a power train,
   a nacelle,
   at least one control unit, and
   a blade pitch system configured to control the pitch angle of each blade,
wherein the method comprises capturing at least one signal indicative of the state of the grid wherein said signal may be indicative of a voltage dip, said method being characterised in that it comprises:

calculating a minimum dip pitch rate limit $(\Delta\beta/\Delta t)min$ lower than a maximum design pitch rate limit $(\Delta\beta/\Delta t)max$, and in that it comprises, in the event that the signal indicative of the state of the grid indicates the presence of a voltage dip:
- calculating at least one signal indicative of a forward/backward oscillation of the nacelle,
- calculating a tower damping pitch rate signal in accordance with the signal indicative of the forward/backward acceleration of the nacelle, and
- calculating a pitch rate command based on the tower damping pitch rate command and on the minimum dip pitch rate limit $(\Delta\beta/\Delta t)min$.

2. The wind turbine control method of claim 1, wherein the minimum dip pitch rate limit $(\Delta\beta/\Delta t)min$ is a value calculated in accordance with the signal indicative of the state of the grid and with a signal indicative of the angular acceleration of the rotor.

3. The wind turbine control method of claim 2, wherein the signal indicative of the angular acceleration of the rotor is calculated based on a difference between electric torques, determining a first electric torque from the signal indicative of the state of the grid an instant before the detection of the voltage dip and determining a second electric torque from the signal indicative of the state of the grid an instant after the detection of the voltage dip.

4. The wind turbine control method of claim 2, wherein the signal indicative of the angular acceleration of the rotor is calculated based on at least two rotor speed measurements in two different instances, where at least one of the measurements is determined from the signal indicative of the state of the grid an instant after the detection of the voltage dip.

5. The wind turbine control method of either claim 3 or 4, further comprising calculating, based on the angular rotor acceleration signal, a maximum time interval tmax in which a disconnection rotor rotation speed is reached as of a speed in the initial instant of the dip $\Omega 0(dip)$.

6. The wind turbine control method of claim 5, further comprising calculating a pitch correction term $\Delta\beta$ that equates an aerodynamic power captured from the wind Pmec to a power evacuable by the grid Pevacuable.

7. The wind turbine control of claim 6, further comprising calculating a minimum dip pitch rate limit $(\Delta\beta/\Delta t)min$ calculated as the quotient between the pitch correction term $\Delta\beta$ and a time less than or equal to tmax.

8. The wind turbine control method of claim 7, wherein the pitch rate command is obtained by adding the minimum dip pitch rate limit $(\Delta\beta/\Delta t)min$ and the tower damping pitch rate command.

9. The wind turbine control method of claim 1, characterised in that the signal indicative of the grid is evacuable power calculated based on a measured grid voltage and a maximum current limit.

10. The wind turbine control method of any one of claim 1 further comprising upon detecting the presence of voltage dip as of the signal indicative of the state of the grid, it additionally comprises activating a wind turbine stop in accordance with the duration of the voltage dip.

11. The wind turbine control method of claim 1, further comprising calculating commands for torque (Tref) or power for the inverter, wherein said calculation comprises the following sub-steps:
- calculating a signal indicative of the sideways oscillation of the nacelle,
- calculating an initial torque (Ti) or power command of an operating state of the turbine,
- calculating a torque (Taj) or power adjustment term to dampen the sideways oscillation of the nacelle,
- calculating a final torque or power command (Tref) by applying the adjustment term to the initial command,
- estimating a maximum evacuable active power (Pevacuable) based on grid voltage (Vnet),
- calculating a maximum adjustment term value (Tajmax),
- calculating a limit value of an initial torque (Timax) or power command based on the maximum evacuable power (Pev) and on the maximum adjustment term value (Tajmax), and
- applying the maximum adjustment term value (Tajmax) to the initial torque (Ti) or power command prior to applying the adjustment term (Taj) for calculating the final command (Tref), thereby reserving a torque or power range in order for the adjustment term to dampen the sideways oscillation of the nacelle.

12. The wind turbine control method of claim 11, wherein the maximum adjustment term value (Tajmax) is the maximum of the values of the torque adjustment term (Taj) applied in previous calculation cycles.

13. The wind turbine control method of claim 12, further comprising:
- calculating the final command (Tref) by adding the torque adjustment term (Taj) and the initial torque command (Ti), and
- calculating the initial torque command (Timax) based on the difference between the initial torque or power command (Tmax) at which an active power substantially equal to the maximum evacuable active power (Pev) and the maximum adjustment term value (Tajmax) would be generated.

14. The wind turbine control method of claim 11, further comprising:
- calculating a braking torque in accordance with the signal indicative of the sideways oscillation of the nacelle, and
- applying the braking torque command to the power train brake.

* * * * *